US008645579B2

(12) United States Patent
Young et al.

(10) Patent No.: US 8,645,579 B2
(45) Date of Patent: Feb. 4, 2014

(54) VIRTUAL MEDIA DEVICE

(75) Inventors: Robert D Young, Kirkland, WA (US);
Stephen Cooper, Seattle, WA (US);
Garret Buban, Carnation, WA (US);
Brien Roell, Seattle, WA (US); David V Skyberg, Monroe, WA (US); Dennis Ming-Shu Lee, Bellevue, WA (US);
Doron Holan, Seattle, WA (US); Anand Ganesh, Bellevue, WA (US); David Roberts, Redmond, WA (US); Noel Richard Cross, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 12/129,663

(22) Filed: May 29, 2008

(65) Prior Publication Data

US 2009/0300241 A1    Dec. 3, 2009

(51) Int. Cl.
*G06F 15/16*    (2006.01)

(52) U.S. Cl.
USPC ........... 709/250; 709/228; 709/226; 348/211; 713/164

(58) Field of Classification Search
USPC ....................................... 709/250
See application file for complete search history.

(56) References Cited

U.S. PATENT DOCUMENTS

| | | | |
|---|---|---|---|
| 6,509,911 B1 * | 1/2003 | Shimotono | 715/761 |
| 6,629,143 B1 * | 9/2003 | Pang | 709/226 |
| 6,804,718 B1 * | 10/2004 | Pang et al. | 709/226 |
| 6,845,398 B1 | 1/2005 | Galensky et al. | |
| 7,221,386 B2 | 5/2007 | Thacher et al. | |
| 7,702,906 B1 * | 4/2010 | Karr et al. | 713/164 |
| 2003/0133015 A1 | 7/2003 | Jackel et al. | |
| 2003/0177389 A1 * | 9/2003 | Albert et al. | 713/201 |
| 2003/0204700 A1 | 10/2003 | Biessener et al. | |
| 2006/0001737 A1 | 1/2006 | Dawson et al. | |
| 2006/0026162 A1 * | 2/2006 | Salmonsen et al. | 707/10 |
| 2006/0064419 A1 * | 3/2006 | Pan et al. | 707/10 |
| 2006/0136972 A1 | 6/2006 | Metzger et al. | |
| 2006/0244839 A1 * | 11/2006 | Glatron et al. | 348/211.11 |
| 2007/0011338 A1 * | 1/2007 | Glatron et al. | 709/228 |
| 2007/0147827 A1 | 6/2007 | Sheynman et al. | |
| 2007/0240190 A1 | 10/2007 | Arseneau et al. | |
| 2007/0291709 A1 | 12/2007 | Wassingbo et al. | |

FOREIGN PATENT DOCUMENTS

| | | |
|---|---|---|
| JP | 2006344218 A | 12/2006 |
| WO | 2005043408 A1 | 5/2005 |
| WO | WO2006113711 A2 | 10/2006 |

OTHER PUBLICATIONS

Montayre, et al., "Remote Controlled Surveillance with Wireless Video Streaming", 2006, pp. 1-8.
"Portable Wireless Video Streaming Solution Demonstrated at APCO", retrieved at <<http://www.asteriskvoipnews.com/wireless_hardware/portable_wireless_video_streaming_solution_demonstrated_at_apco.html>>, pp. 3.

(Continued)

*Primary Examiner* — Andrew Goldberg
(74) *Attorney, Agent, or Firm* — Alleman Hall McCoy Russell & Tuttle LLP

(57) ABSTRACT

A system, device, and method for virtually connecting a media device to a computing device are disclosed. One embodiment comprises a method to operate a virtual media device in a computing device, wherein the virtual media device that is controlled by a remote media device. In this manner, a computing device may stream media data to and from the remote media device.

19 Claims, 4 Drawing Sheets

(56) References Cited

OTHER PUBLICATIONS

"Wi-Fi USB Dongle RangeMax Next Wireless-N 300Mbps", retrieved at <<http://www.maplin.co.uk/ module.aspx?ModuleNo=219533&DOY=15m2&tabs=n>>pp. 3.

"Silex Introduces World's First Wireless USB Device Server With Streaming Video and Audio Data Transfer", Jan. 15, 2008, Silex Technology, pp. 2.

ISA Korea, International Search Report of PCT/US2009/043520, Jan. 27, 2010, 3 pages.

\* cited by examiner

VIRTUAL MEDIA DEVICE

BACKGROUND

Real-time multimedia communications are increasingly used as applications are able to be developed to utilize multimedia and as network infrastructures can handle increased throughput. One example of real-time multimedia communications is Internet Messaging using a web-camera. Most web-cameras for audio and video communications today have a physical connection to a host computer via a Universal Serial Bus (USB) cable. This restricts the web-camera to within a certain distance of the host computer, therefore preventing the web-camera from roaming around a house, office, coffee shop, etc.

Some web-cameras connect to host computers as Internet Protocol (IP) devices. This allows a web-camera to move remotely from a host computer, but the web-camera functionality is accessed as an external service that is not visible to applications running on the host computer without knowing the IP address for the IP web-camera.

SUMMARY

A virtual media device is disclosed. For example, one embodiment comprises a virtual media device operating in a computing device, wherein the virtual media device is controlled by a remote media device. In this manner, a computing device may stream media data to and from the remote media device.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
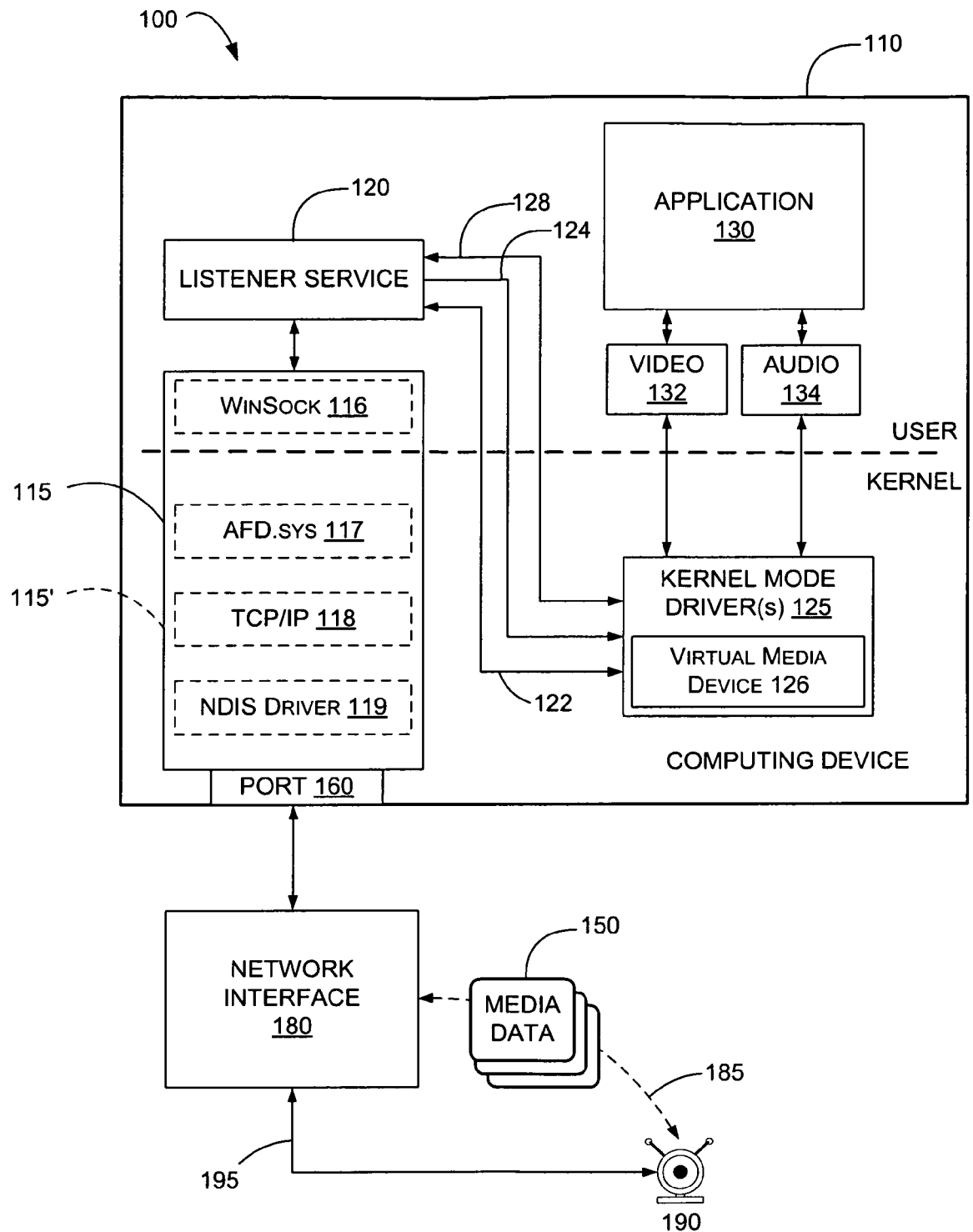
FIG. 1 shows an example of an embodiment computing device for virtually connecting with a media device.

FIG. 1 shows an example system 100 including an embodiment computing device 110 for virtually connecting with a remote media device 190. Computing device 110 includes a port 160 to receive media data 150 through a network interface 180 from a remote media device 190. Computing device 110 may also include a kernel mode driver 125 running a virtual media device 126, however other embodiments are not so limited and virtual media device 126 may operate in a different environment than a kernel mode driver 125. In this way, the virtual media device can be controlled by data or commands sent from the remote media device 190.

Computing device 110 includes a listener service 120 in communication with port 160 through a communication stack 115, which may further include a network stack, a universal serial bus (USB) stack, or a combination of protocol stacks, etc., and port 160 may be a universal serial bus port, etc. In this way, the listener service 120 may receive the media data 150 from the port 160, and forward it to a virtual media device 126. In one example, a listener service 120 may be a service running in user mode, but other embodiments are not so limited.

An example MICROSOFT WINDOWS communication stack 115' is shown in FIG. 1 with example functional blocks outlined with a dotted line. In this example WINDOWS communication stack 115', a WINDOWS sockets application programming interface (API), or WinSock 116, defines a standard interface for listener service 120 to access network services in the kernel portion of WINDOWS communication stack 115'. WinSock 116 communicates media data 150 and commands using AFD.sys 117, a device driver responsible for managing a TCP/IP 118 communications protocol. For example, AFD.sys 117 may manage a network frame size, or may set a limit on simultaneous network transfers for certain types of devices. Continuing with a WINDOWS example communication stack, media data then may be sent to or received from a network interface card through a logical link control interface, such as through NDIS driver 119. WINDOWS communication stack 115' is one example communication stack according to a WINDOWS architecture and certain protocols. Other embodiments are not so limited and other suitable communications stacks, protocols, connections, combinations, etc., may be used as communications stack 115.

The listener service 120 communicates to the virtual media device 126 through a virtual bus that includes a command bus 128, a video bus 124, and an audio bus 122. Other embodiments may use other communications between listener service 120 and virtual media device 126 in similar fashion to send and receive media data to and from a remote media device.

In the example computing device 110 depicted in FIG. 1, the audio bus 122 and command bus 128 are illustrated as bidirectional. Virtual media device 126 may also be operable to render media data and output the media data to the remotely connected media device through the listener service 120. For example, if remote media device 190 is a web-camera, a user may walk around remotely from computing device 110 and virtual media device 126 may not only receive audio and video data from the web-camera, but may forward audio data from a live chat with a friend in communication with the user through a separate network interface coupled to computing device 110, for example using a live messenger service through the Internet. Additionally, in the illustrated example the virtual media device may be further operable to output a command to control the remotely connected media device through the listener service 120.

The video bus 124 in system 100 is shown as a unidirectional bus to receive video data from the listener service 120 and forward it to the virtual media device 126. Other embodiments are not so limited. For example, as web-cameras may be developed with an interactive display, an embodiment may communicate audio data and video data to and from the web-camera.

In some embodiments, the virtual media device 126 may comprise multiple drivers, such as a system kernel streaming driver, a system port class audio driver, mini-drivers including a virtual audio driver and a virtual video driver, etc. In this way, virtual media device 126 may provide media and multimedia streaming functionality to operate as if the remote media device 190 were directly connected to the computing device 110.

In some embodiments, the media data may be stored in a shared memory to reduce latency induced by multiple copies of the same data. In one example, when media data is received from remote media device 190, the listener service 120 stores the media data in memory, and the virtual media device 126 captures the media data from the memory, instead of having the listener service 120 send the media data to the virtual media device 126 and record the media data to memory multiple times.

In some embodiments, the virtual media device 126 may capture the media data 150 from the listener service 120 and output the media data 150 to an application 130, for example an application program that consumes media data, such as a messaging service, browser, video or audio conferencing software, or other suitable application programs that may communicate media data. In some embodiments, the listener service 120 may be configured to decode the media data and send the media data to virtual media device 126. Additionally, the listener service 120 may be configured to place the media data into a plurality of frames to be sent to the virtual media device 126.

In the illustrated example, virtual media device 126 communicates video data to video stack 132. In a WINDOWS environment, an example video stack 132 is a DirectShow filter graph. Virtual media device 126 may also communicate audio data with audio stack 134. In a WINDOWS environment, an example audio stack 134 is the DirectSound component of the DirectX library of API's. DirectX codec's are explained in the current example; however, embodiments may use other suitable multimedia frameworks.

The remote media device 190 is depicted as a web-camera, such as an IP based web-camera, but other suitable remote devices are not so limited. For example, other IP devices may be coupled to computing device 110 and appear to an application program as if they were directly connected to the computing device 110 in similar fashion to remote media device 190. In some embodiments, other example remote media devices may be simple input and output devices such as keyboards, mice, or other remotely connected devices that may exchange data, media, commands, inputs and outputs, etc. with the computing device 110.

In a more detailed example, in a computing device 110 running a MICROSOFT WINDOWS operating system (OS), a remotely connected media device may be a web-camera that is in communication with the computing device 110 over a wireless network 185, and further communicates multimedia data including audio data and video data to a network interface 180 (e.g. a network interface card or a NIC). Other embodiments may communicate over types of networks other than wireless network 185, or may even communicate over a direct connection, etc., as non-limiting examples. For example, remote media device 190 may be coupled with network interface 180 through wired network 195.

In this example, the web-camera also may receive or send commands to computing device 110 through the network interface 180 using real-time transport control protocol packets, or RTCP packets, and may receive or send multimedia data to computing device 110 through the network interface 180 using real-time transport protocol packets, or RTP packets. Other suitable communications and control protocols can be used to send media data or multimedia data between a remote media device 190 and a computing device 110.

In some embodiments, computing device 110 may provide a locked mode for the port 160. For example, when set to locked mode, the virtual media device may allow listener service 120 to access and/or change a setting of port 160, without allowing an application other than listener service 120 to change port settings.

In one example, kernel mode driver 125 selectively operates a port in a locked mode that restricts changes to port settings.

Figure 2:
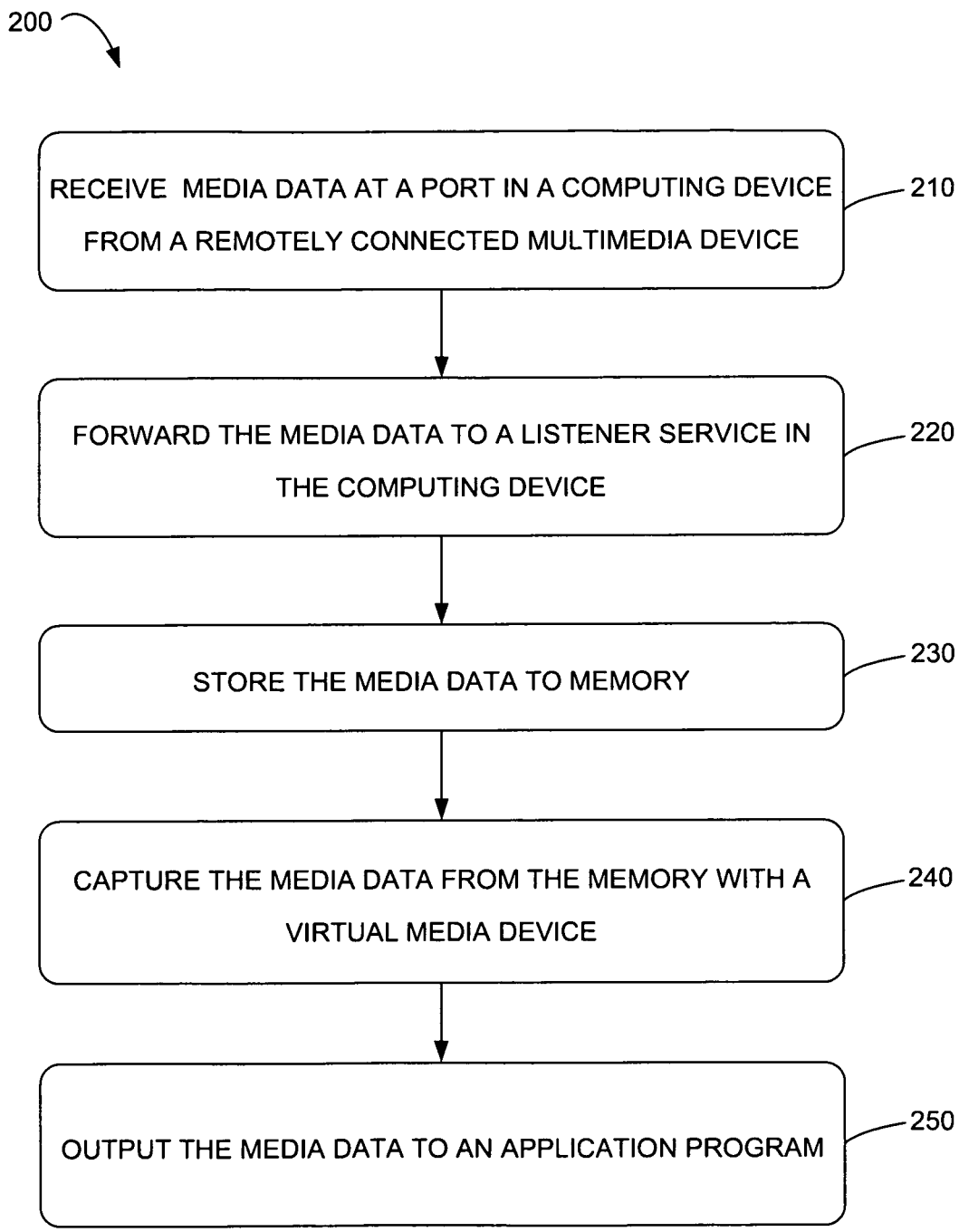
FIG. 2 shows a process flow depicting a method for virtually connecting a media device to a computing device.

FIG. 2 shows a process flow depicting a method 200 for virtually connecting a media device to a computing device. For example, a virtual media device may be controlled by a remote media device by first receiving media data at a port in a computing device from a remotely connected media device, as depicted in block 210. In one example, the media data may be received from a remotely connected media device over a wireless network. Further, the media data may be multimedia data including audio data and/or video data.

In one example, the media data may be received at the port in real-time transport protocol packets, but other protocols suitable for streaming media data may be used. Additionally, some embodiments may comprise decoding the media data with the listener service after it is received at the port. In some embodiments, method 200 may further comprise receiving the media data from the port in real-time transport protocol packets, and encapsulating the media data into a plurality of frames to be sent to the virtual media device.

Then, method 200 also comprises forwarding the media data to a listener service in the computing device, as indicated in block 220. For example, the media data may be forwarded to the listener service through communication stack 115. Examples of communication stack 115 include a network stack, a universal serial bus (USB) stack, or a combination of protocol stacks, etc., and the port may be a universal serial bus port or another suitable communications port.

Next, method 200 comprises storing the media data to memory as indicated at block 230. For example, when media data is received from a remotely connected media device, method 200 further comprises the listener service storing the media data in a shared memory, and a virtual media device capturing the media data from the shared memory, instead of having the listener service send the media data to the virtual media device and record the media data to memory multiple times, as illustrated in block 240.

Then, after capturing the media data from the memory with a virtual media device, method 200 comprises outputting the media data to an application program as shown in block 250. In this way, the virtual media device may provide media and multimedia streaming functionality as if a remote media device were directly connected to a computing device.

In some embodiments, method 200 further comprises providing a locked mode for the port, wherein when the virtual media device is configured to set a port to a locked mode an unauthorized application cannot change port settings.

In some embodiments, method 200 may include bidirectional communications with a remotely connected media device. For example, method 200 may further comprise rendering media data with the virtual media device, and outputting the media data to the remotely connected media device through the listener service.

Additionally, method 200 may further comprise outputting a command with the virtual media device to control the remotely connected media device through the listener service. For example, if the remotely connected media device is a web-camera, the web-camera may have settings that may be adjusted. In this way, method 200 may send commands to adjust the settings including zooming in or out, turning a volume up or down, powering on or off, or other settings on a remotely connected media device that may be operated by commands.

Figure 3:
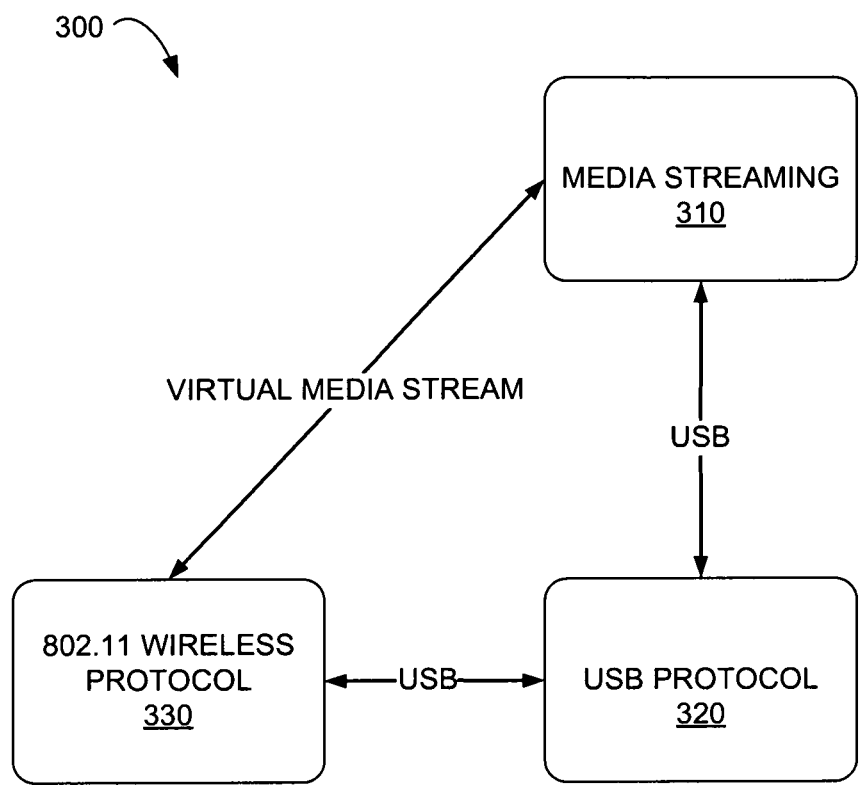
FIG. 3 shows a block diagram of an embodiment computing device for virtually connecting with a media device.

FIG. 3 shows a block diagram illustrating one example system 300 with a virtual connection between media streaming service 310 and an 802.11 wireless protocol 330. For example, a media device, such as a web-camera, may provide a media stream to be consumed by a computing device. Additionally, the web-camera may be wirelessly decoupled from the computing device using a wirelessly compatible USB dongle that enumerates as a USB audio class device and also enumerates as a USB video class device. Other embodiments are not so limited, for example instead of a USB interface, an interface may be IEEE 1394, SCSI, Bluetooth, or other suitable interfaces.

For example, the web-camera may be wirelessly connected to a computing device over the IEEE 802.11 suite of wireless protocols and may convert from a wireless protocol to USB audio and video data. However, this example would convert from 802.11 wireless protocol into the USB protocol. FIG. 3 illustrates a system providing a virtual media stream according to the embodiments described above with reference to FIGS. 1-2. Other embodiments may use other protocols than those depicted in FIG. 3, and other embodiments may also establish virtual media streams between different components than those listed in FIG. 3.

With reference to the example in FIG. 1, the USB protocol 320 conversion in FIG. 3 would take place in a USB stack coupled directly to kernel mode media drivers or a virtual media device. However, the configuration illustrated in FIG. 1 passes the media data received from the wireless protocol to the listener service 120, then down to the virtual media device 126 and back up to a listener media streaming service. Referring now to system 300, a media stream may be sent over an 802.11 wireless protocol 330.

Instead of converting the media stream from the 802.11 wireless protocol into the USB protocol 320, and sending the media stream to a media streaming service 310, system 300 establishes a virtual media stream from the 802.11 wireless protocol 330 to the media streaming service 310. This approach allows an IP connected device to provide media data to a virtual media device and thus create a virtual media stream between the 802.11 wireless protocol 330 and the media streaming service 310.

Figure 4:
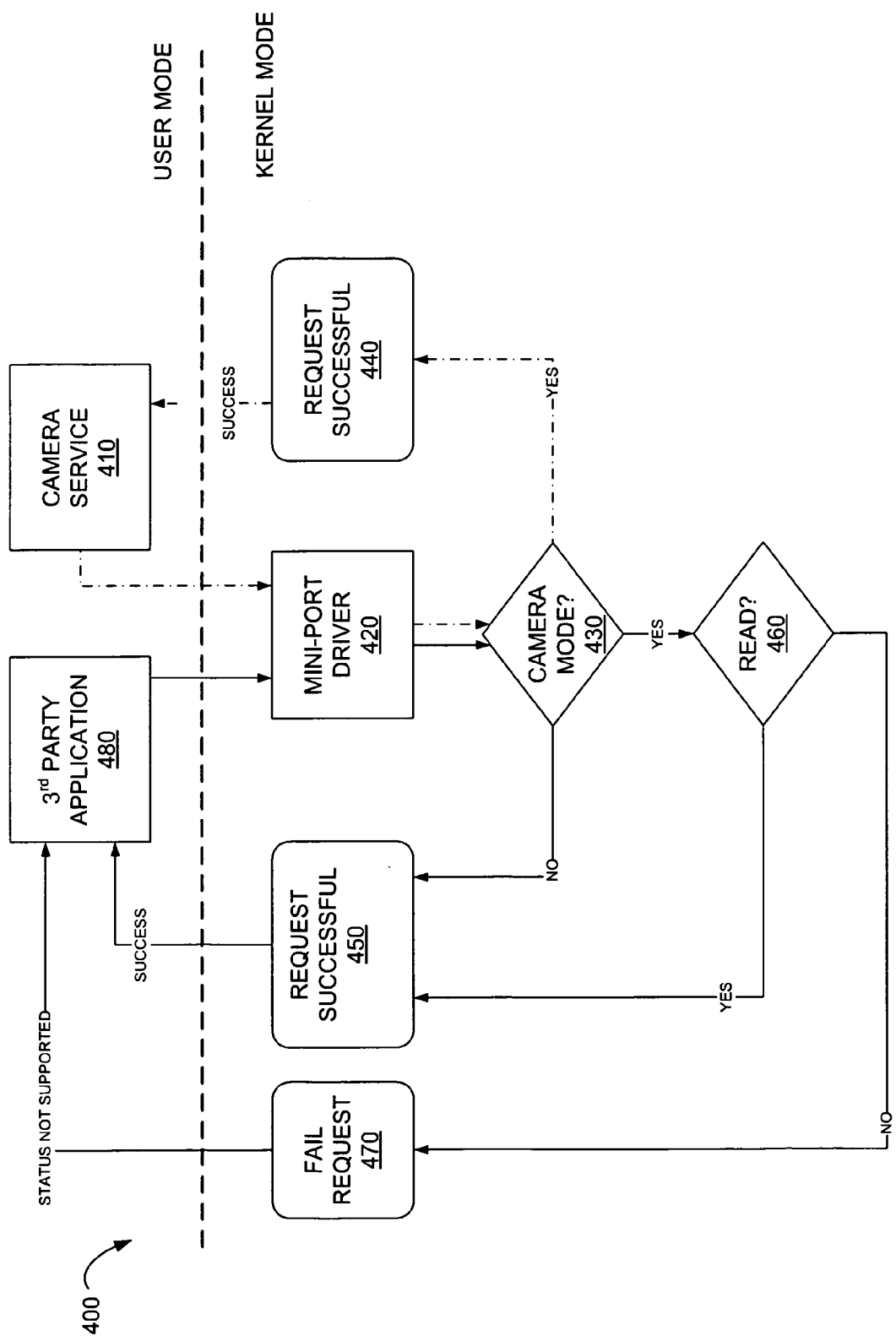
FIG. 4 shows a process flow depicting a method for switching an embodiment driver between a normal mode and a reserved mode.

FIG. 4 shows a process flow depicting a method 400 for switching port between a normal mode and a locked mode. In the example illustrated in FIG. 4, the locked mode is illustrated as a camera mode wherein configuration settings for a port may be locked to $3^{rd}$ party applications but configuration settings may be changed by camera service 410. Other embodiments are not so limited, and port or other configuration settings may be locked for most applications yet unlocked and changeable by a virtual device, service, etc. Additionally, FIG. 4 illustrates two control loops, a first control loop for the camera service 410 is depicted by the dot-dash arrows on the right side of the figure, and a second control loop for a $3^{rd}$ party application 480 is depicted by the solid arrows on the left side of the figure.

Method 400 includes a camera service 410 and a $3^{rd}$ party application 480 operating in user mode, and a mini-port driver 420 operating in kernel mode. Camera service 410 and $3^{rd}$ party application 480 send a set request or a get request to mini-port driver 420, wherein a set request is to control settings, and a get request is to get media data, etc. In method 400, either camera service 410 or $3^{rd}$ party application 480 may send a request.

In response to a request, the mini-port driver 420 then forwards the request to decision block 430 to determine if the computing device is in camera mode. If the computing device is in camera mode and the request came from the camera service 410, then a request successful message 440 is sent to the camera service. For example, if the request was to either set a control setting or to get data, then since the request came from the camera service 410 the request successful message 440 is sent.

However, if a request is received at mini-port driver 420 from $3^{rd}$ party application and the computing device is not in camera mode, then a request successful message 450 is sent to $3^{rd}$ party application 480. The reason a request successful message 450 is sent to $3^{rd}$ party application 480 is that since the computing device is not in camera mode, then the $3^{rd}$ party application may change network settings or get media data.

If however the computing device is in camera mode and the request was sent from the $3^{rd}$ party application 480, then method 400 forwards the request to decision block 460 to determine if the request was a read request, such as a get, or a write request such as a set. In this case, if the request was a read request then a request successful message 450 is sent to the $3^{rd}$ party application 480 since the $3^{rd}$ party application is not trying to change network settings but is only trying to receive data from a remotely connected camera.

In method 400, a fail request 470 is returned if the request is from a $3^{rd}$ party application 480 and it was a set request, and the computing device is in camera mode. In this way, the mini-port driver 420 may allow camera service 410 to get media data or change network settings, and the mini-port driver 420 may also provide a camera only mode where $3^{rd}$ party applications can only read data from a remotely connected media device but not change network settings.

It will be appreciated that the embodiments described herein may be implemented, for example, via computer-executable instructions or code, such as programs, stored on a computer-readable medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program.

The terms "computer" and "computing device" as used herein include any device that electronically executes one or more programs, including, but not limited to, personal computers, laptop computers, hand-held devices, cellular phones, microprocessor-based programmable consumer electronics and/or appliances, and any other suitable computing devices that may provide a local virtual media device that communicates media data with a remote media device.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted.

The order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system, comprising:
   a peripheral device configured to communicate with a computing device over a wireless network; and
   a computing device comprising instructions executable to operate:
      a user mode application program configured to communicate with a kernel mode driver and also configured to run in a user mode;
      a port configured to receive media data via internet protocol from the peripheral device over the wireless network;
      a communication stack configured to receive communications from the port, the communication stack comprising a kernel mode portion in communication with the port and also comprising a user mode portion;
      a user mode listener service configured to run in the user mode, the user mode listener service in communication with the port through the communication stack to receive the media data from the port; and
      a kernel mode virtual media device in communication with the user mode listener service and the user mode application program and configured to run in a kernel mode and to capture the media data from the user mode listener service via a virtual bus, and output the media data to the user mode application program, the kernel mode virtual media device having one or more of a virtual video driver and a virtual audio driver to provide media streaming functionality from the peripheral device to the application program,
   wherein the virtual media device is configured to selectively set the port to a locked mode in which applications other than the user mode listener service cannot change port settings, and the virtual media device is configured to selectively set the port to a normal mode in which other applications can change port settings.

2. The computing device of claim 1, wherein the peripheral device is wirelessly decoupled from the computing device using a wirelessly compatible universal serial bus transmitter/receiver that enumerates as a universal serial bus audio class device and also enumerates as a universal serial bus video class device.

3. The computing device of claim 1, wherein the virtual media device is further operable to render second media data and output the second media data to the user mode listener service via the virtual bus, and wherein the listener service is further operable to output the second media data to the peripheral device.

4. The computing device of claim 1, wherein the kernel mode virtual media device is further operable to output a command to the user mode listener service via the virtual bus, and the user mode listener service is further operable to output the command to the peripheral device to control the peripheral device.

5. The computing device of claim 1, wherein the media data is multimedia data including audio data and video data.

6. The computing device of claim 1, wherein the user mode listener service stores the media data in memory, and the kernel mode virtual media device captures the media data from the memory.

7. The computing device of claim 1, wherein the user mode listener service is configured to receive the media data from the port in real-time transport protocol packets, and the user mode listener service is further configured to decode the media data.

8. The computing device of claim 1, wherein the user mode listener service is configured to receive the media data from the port in real-time transport protocol packets, and is further configured to place the media data into a plurality of frames to be sent to the kernel mode virtual media device.

9. The computing device of claim 1, wherein the port is a universal serial bus port.

10. The system of claim 1, where the kernel mode virtual media device is configured to provide a virtual media stream to the user mode application program without converting the media data to a universal serial bus protocol.

11. The system of claim 1, wherein the kernel mode virtual media device selectively operates the port in a camera mode in which the user mode listener service is operable to receive media data via the port and output commands via the port to the peripheral device to control settings of the peripheral device, in which the user mode application program receives media data via the port through the user mode listener service, and in which the user mode application program cannot change one or more of network or port settings.

12. In a computing device, a method for receiving data from a wireless web-camera, the method comprising:
   receiving media data in real-time transport protocol packets at a port in a computing device from the wireless web-camera over a wireless network, where the media data received is not visible to a user mode application running on the computing device that is configured to receive data from a kernel mode driver;
   forwarding the media data from the port to a kernel mode portion of a communication stack;
   forwarding the media data from the kernel mode portion of the communication stack to a user mode portion of the communication stack and then to a user mode listener service running in a user mode of the computing device;
   storing the media data via the user mode listener service to memory;
   capturing the media data via a virtual bus from the memory with a kernel mode virtual media device running in a kernel mode of the computing device, the virtual bus including a command bus, a video bus, and an audio bus;
   outputting the media data as a virtual media stream from the kernel mode virtual media device to the user mode application, the outputting including providing media streaming functionality from the wireless web-camera to the user mode application program via one or more of a kernel mode virtual video driver and a kernel mode virtual audio driver at the kernel mode virtual media device without converting the media data or the virtual media stream to a universal serial bus protocol; and
   while receiving the media data, setting and operating the port in a locked mode that only allows the listener service to change port settings, wherein, when the port is set to the locked mode, the user mode listener service is operable to receive media data from the port via the kernel mode portion of the communication stack and output commands via the kernel mode portion of the communication stack and the port to the web-camera to control settings of the web-camera, and other programs cannot change port settings, and
   after receiving the media data, setting and operating the port in a normal mode in which other programs can change port settings.

13. The method of claim 12, wherein the web-camera is wirelessly decoupled from the computing device using a wirelessly compatible universal serial bus transmitter/receiver that enumerates as a universal serial bus audio class device and also enumerates as a universal serial bus video class device.

14. The method of claim 12, further comprising:
rendering second media data with the kernel mode virtual media device; and
outputting the second media data to the wireless web-camera through the user mode listener service.

15. The method of claim 12, further comprising outputting a command from the kernel mode virtual media device to control the wireless web-camera through the user mode listener service.

16. The method of claim 12, wherein the media data is multimedia data including audio data and video data.

17. The method of claim 12, further comprising:
decoding the media data with the user mode listener service.

18. The method of claim 12, further comprising:
encapsulating the media data into a plurality of frames to be sent to the kernel mode virtual media device.

19. A computer-readable memory comprising instructions executable by a computing device to communicate with a remotely connected web-camera by:
receiving media data in real-time transport protocol packets at a port in a computing device from the remotely connected web-camera over a wireless network, where the media data is not visible to a user mode instant messaging application running on the computing device;
forwarding the media data from the port to a kernel mode portion of a communication stack;
forwarding the media data from the kernel mode portion of the communication stack to a user portion of the communication stack and then to a user mode listener service configured to run in a user mode of the computing device;
storing the media data via the user mode listener service to memory;
capturing the media data via a virtual bus from the memory with a kernel mode virtual media device configured to run in a kernel mode of the computing device, the virtual bus including a command bus, a video bus, and an audio bus;
outputting the media data as a virtual media stream from the kernel mode virtual media device to the user mode instant messaging application, the outputting including providing media streaming functionality from the remotely connected web-camera to the user mode instant messaging application via one or more of a kernel mode virtual video driver and a kernel mode virtual audio driver at the kernel mode virtual media device;
receiving one or more of a command, audio data, and video data from the user mode instant messaging application at the kernel mode virtual media device;
passing the one or more of the command, the audio data, and the video data from the kernel mode virtual media device to the user mode listener service via the virtual bus;
passing the one or more of the command, the audio data, and the video data from the user mode listener service to the communication stack; and
outputting the one or more of the command, the audio data, and the video data to the remotely connected web-camera; and
setting and operating the port in a locked mode in which the user mode listener service can change port settings but other applications cannot change port settings, and a normal mode in which other applications can change port settings.

* * * * *